United States Patent [19]
Geshwind

[11] Patent Number: 5,978,035
[45] Date of Patent: *Nov. 2, 1999

[54] METHODS AND DEVICES FOR ENCODING HIGH-DEFINITION SIGNALS BY COMPUTING SELECTION ALGORITHMS AND RECORDING IN AN OFF-LINE MANNER

[76] Inventor: David Michael Geshwind, 111 Fourth Ave., New York, N.Y. 10003

[*] Notice: This patent is subject to a terminal disclaimer.

[21] Appl. No.: 08/483,206

[22] Filed: Jun. 7, 1995

Related U.S. Application Data

[63] Continuation-in-part of application No. 08/485,383, Jun. 7, 1995, which is a continuation-in-part of application No. 07/077,916, Jul. 27, 1987, and application No. 08/110,230, Aug. 23, 1993, which is a continuation-in-part of application No. 07/435,487, Aug. 17, 1989, abandoned, which is a continuation-in-part of application No. 07/227,403, Dec. 17, 1986, Pat. No. 4,925,294, and application No. 07/006,291, Jan. 20, 1987, Pat. No. 5,050,894, which is a continuation of application No. 06/601,091, Apr. 20, 1984, abandoned, which is a continuation-in-part of application No. 06/492,816, May 9, 1983, Pat. No. 4,606,625, said application No. 08/485,383, is a continuation-in-part of application No. 07/951,267, Sep. 25, 1992, which is a continuation-in-part of application No. 07/435,487, and application No. 07/077,916.

[51] Int. Cl.⁶ ................................................ H04N 7/01
[52] U.S. Cl. .......................... 348/441; 348/458; 386/123
[58] Field of Search .................................. 348/384, 390, 348/441, 571, 458, 413; 386/123; 345/118

[56] References Cited

U.S. PATENT DOCUMENTS

| 2,940,005 | 6/1960 | Toulon | 348/384 |
| 4,405,943 | 9/1983 | Kanaly | 348/384 |
| 4,692,806 | 9/1987 | Anderson et al. | 348/441 |
| 4,855,822 | 8/1989 | Narendra et al. | 348/118 |
| 5,327,235 | 7/1994 | Richards | 348/441 |
| 5,404,170 | 4/1995 | Keating | 348/458 |
| 5,642,168 | 6/1997 | Masaki | 348/441 |

*Primary Examiner*—Victor R. Kostak

[57] ABSTRACT

Off-line computation and recording is applied (via an underpowered processor) to the encoding, for bandwidth compression, of a high-resolution video signal. This technique permits more compute cycles to be applied to each frame than if the process were attempted to be accomplished in real time. Better compression ratios and/or better visual quality are, thus, achieved than if the process were attempted to be performed by the same processor in a real-time manner.

30 Claims, 9 Drawing Sheets

OFF-LINE ENCODING EMBODIMENT

FIGURE 1

SOURCE

| A* 11 | B 11 | A* 12 | B 12 | A* 13 | B 13 |
|---|---|---|---|---|---|
| D 11 | C 11 | D 12 | C 12 | D 13 | C 13 |
| A* 21 | B 21 | A* 22 | B 22 | A* 23 | B 23 |
| D 21 | C 21 | D 22 | C 22 | D 23 | C 23 |
| A* 31 | B 31 | A* 32 | B 32 | A* 33 | B 33 |
| D 31 | C 31 | D 32 | C 32 | D 33 | C 33 |

DESTINATION

| A 11 | A 11 | A 12 | A 12 | A 13 | A 13 |
|---|---|---|---|---|---|
| A 11 | A 11 | A 12 | A 12 | A 13 | A 13 |
| A 21 | A 21 | A 22 | A 22 | A 23 | A 23 |
| A 21 | A 21 | A 22 | A 22 | A 23 | A 23 |
| A 31 | A 31 | A 32 | A 32 | A 33 | A 33 |
| A 31 | A 31 | A 32 | A 32 | A 33 | A 33 |

FIGURE 2

SOURCE

| A 11 | B 11 | A 12 | B 12 | A 13 | B 13 |
|---|---|---|---|---|---|
| D 11 | C 11 | D 12 | C 12 | D 13 | C 13 |
| A 21 | B 21 | A 22 | B 22 | A 23 | B 23 |
| D 21 | C 21 | D 22 | C 22 | D 23 | C 23 |
| A 31 | B 31 | A 32 | B 32 | A 33 | B 33 |
| D 31 | C 31 | D 32 | C 32 | D 33 | C 33 |

DESTINATION

| X 11 | X 11 | X 12 | X 12 | X 13 | X 13 |
|---|---|---|---|---|---|
| X 11 | X 11 | X 12 | X 12 | X 13 | X 13 |
| X 21 | X 21 | X 22 | X 22 | X 23 | X 23 |
| X 21 | X 21 | X 22 | X 22 | X 23 | X 23 |
| X 31 | X 31 | X 32 | X 32 | X 33 | X 33 |
| X 31 | X 31 | X 32 | X 32 | X 33 | X 33 |

FIGURE 3

SOURCE

| A* 11 | B 11 | A* 12 | B 12 | A* 13 | B 13 |
|---|---|---|---|---|---|
| D 11 | C 11 | D 12 | C 12 | D 13 | C 13 |
| A* 21 | B 21 | A* 22 | B 22 | A* 23 | B 23 |
| D 21 | C 21 | D 22 | C 22 | D 23 | C 23 |
| A* 31 | B 31 | A* 32 | B 32 | A* 33 | B 33 |
| D 31 | C 31 | D 32 | C 32 | D 33 | C 33 |

DESTINATION

| A 11 | A 11 | A 12 | A 12 | A 13 | A 13 |
|---|---|---|---|---|---|
| A 11 | A 11 | A 12 | A 12 | A 13 | A 13 |
| A 21 | A 21 | A 22 | A 22 | A 23 | A 23 |
| A 21 | A 21 | A 22 | A 22 | A 23 | A 23 |
| A 31 | A 31 | A 32 | A 32 | A 33 | A 33 |
| A 31 | A 31 | A 32 | A 32 | A 33 | A 33 |

FIGURE 4A

SOURCE

| A 11 | B* 11 | A 12 | B* 12 | A 13 | B* 13 |
|------|-------|------|-------|------|-------|
| D 11 | C 11  | D 12 | C 12  | D 13 | C 13  |
| A 21 | B* 21 | A 22 | B* 22 | A 23 | B* 23 |
| D 21 | C 21  | D 22 | C 22  | D 23 | C 23  |
| A 31 | B* 31 | A 32 | B* 32 | A 33 | B* 33 |
| D 31 | C 31  | D 32 | C 32  | D 33 | C 33  |

DESTINATION

| B 11 | B 11 | B 12 | B 12 | B 13 | B 13 |
|------|------|------|------|------|------|
| B 11 | B 11 | B 12 | B 12 | B 13 | B 13 |
| B 21 | B 21 | B 22 | B 22 | B 23 | B 23 |
| B 21 | B 21 | B 22 | B 22 | B 23 | B 23 |
| B 31 | B 31 | B 32 | B 32 | B 33 | B 33 |
| B 31 | B 31 | B 32 | B 32 | B 33 | B 33 |

FIGURE 4B

SOURCE

| A 11 | B 11 | A 12 | B 12 | A 13 | B 13 |
|---|---|---|---|---|---|
| D 11 | C* 11 | D 12 | C* 12 | D 13 | C* 13 |
| A 21 | B 21 | A 22 | B 22 | A 23 | B 23 |
| D 21 | C* 21 | D 22 | C* 22 | D 23 | C* 23 |
| A 31 | B 31 | A 32 | B 32 | A 33 | B 33 |
| D 31 | C* 31 | D 32 | C* 32 | D 33 | C* 33 |

DESTINATION

| C 11 | C 11 | C 12 | C 12 | C 13 | C 13 |
|---|---|---|---|---|---|
| C 11 | C 11 | C 12 | C 12 | C 13 | C 13 |
| C 21 | C 21 | C 22 | C 22 | C 23 | C 23 |
| C 21 | C 21 | C 22 | C 22 | C 23 | C 23 |
| C 31 | C 31 | C 32 | C 32 | C 33 | C 33 |
| C 31 | C 31 | C 32 | C 32 | C 33 | C 33 |

FIGURE 4C

SOURCE

| A 11 | B 11 | A 12 | B 12 | A 13 | B 13 |
|---|---|---|---|---|---|
| D* 11 | C 11 | D* 12 | C 12 | D* 13 | C 13 |
| A 21 | B 21 | A 22 | B 22 | A 23 | B 23 |
| D* 21 | C 21 | D* 22 | C 22 | D* 23 | C 23 |
| A 31 | B 31 | A 32 | B 32 | A 33 | B 33 |
| D* 31 | C 31 | D* 32 | C 32 | D* 33 | C 33 |

DESTINATION

| D 11 | D 11 | D 12 | D 12 | D 13 | D 13 |
|---|---|---|---|---|---|
| D 11 | D 11 | D 12 | D 12 | D 13 | D 13 |
| D 21 | D 21 | D 22 | D 22 | D 23 | D 23 |
| D 21 | D 21 | D 22 | D 22 | D 23 | D 23 |
| D 31 | D 31 | D 32 | D 32 | D 33 | D 33 |
| D 31 | D 31 | D 32 | D 32 | D 33 | D 33 |

FIGURE 4D

OFF-LINE RECORDING AND REAL-TIME PLAYBACK/DELIVERY

FIGURE 5

OFF-LINE ENCODING EMBODIMENT

FIGURE 6

METHODS AND DEVICES FOR ENCODING HIGH-DEFINITION SIGNALS BY COMPUTING SELECTION ALGORITHMS AND RECORDING IN AN OFF-LINE MANNER

The instant application is a continuation-in-part of applicant's prior application METHODS AND DEVICES FOR TIME-VARYING SELECTION AND ARRANGEMENT OF DATA POINTS WITH PARTICULAR APPLICATION TO THE CREATION OF NTSC-COMPATIBLE HDTV SIGNALS Ser. No. 08/485,383 filed Jun. 7, 1995.

That prior application is a continuation-in-part of applicant's application Ser. No. 07/077,916 filed Jul. 27, 1987.

That prior application is also a continuation-in-part of applicant's application Ser. No. 08/110,230 filed Aug. 23, 1993 which is a continuation-in-part of Ser. No. 07/435,487 (filed Aug. 17, 1989, now abandoned), which was both: a continuation-in-part of application Ser. No. 07/227,403 filed Dec. 17, 1986 (issued May 15, 1990 as U.S. Pat. No. 4,925,294); and, a continuation-in-part of application Ser. No. 07/006,291 filed Jan. 20, 1987 (issued Sep. 24, 1991 as U.S. Pat. No. 5,050,894) which was a continuation of Ser. No. 06/601,091 (filed Apr. 20, 1984, now abandoned) which was a continuation-in-part of application Ser. No. 06/492,816 filed May 9, 1983 (issued Aug. 19, 1986 as U.S. Pat. No. 4,606,625).

That prior application is also a continuation-in-part of applicant's application Ser. No. 07/951,267 filed Sep. 25, 1992 which is a continuation-in-part of the above referenced application Ser. No. 07/435,487 and also of the above referenced application Ser. No. 07/077,916.

All of these documents (except for those abandoned) are hereby incorporated by reference.

TECHNICAL FIELD

The instant invention relates to a class of methods for selecting subsets of information, such as that derived by digitizing a high-definition television signal, and arranging that reduced amount of information into a second set of information which can then be, for example, converted to a low-definition signal which can then be transmitted over channels intended for low-definition signals, with minimal perceivable artifacts; as well as the off-line (i.e., not in real time) computation of such algorithms as applied to digital data derived from information bearing signals, which was developed to affect the foregoing, but which also can be independently practiced to great advantage.

SCOPE OF INVENTION AND PRIOR ART

Generally, the domain where the instant invention can be applied is any process, system, device, or product made by a process, which involves a processing element whereby a first information bearing signal (often, a three-dimensional data construct consisting of a two-dimensional image plane and a third dimension of time—e.g., a television or motion picture image stream) is transformed into a second information bearing signal of similar type. Further, these signals, though of similar type, are, generally, different in some characteristic, such as resolution or definition. Examples of such areas of potential application include, without limitation, devices or processes that: encode a higher-definition television or video signal into a lower-definition television or video signal suitable for transmission, display or recording; record, transmit, decode or display such an encoded signal; transduce or transfer an image stream from an imaging element to a transmission or storage element, such as a television camera or film chain; transfer an image stream from a signal input to a recording medium, such as a videotape or videodisc recorder; transfer an image stream from a recording medium to a display element, such as a videotape or videodisc player; transfer data representing images from a computer memory element to a display element, such as a framestore or frame buffer; synthesize an image output stream from a mathematical model, such as a computer graphic rendering component; modify or combine image streams, such as image processing components, time-base correctors, signal processing components, or special effects components; products that result from the foregoing; and many other devices, processes and products that fall within the realm of motion picture and television engineering.

The invention, rather than comprising any of the foregoing, constitutes a method (e.g., a process or algorithm) for selecting and arranging information derived from the first information bearing signal, which processed information will then be used to create a second information bearing signal. Thus, the inventive matter comprises algorithms for selecting and arranging information; as well as otherwise standard devices or processes that incorporate those algorithms, and specially modified or constructed devices and processes that incorporate those algorithms. In particular, the subject of the instant application is a technique of off-line (i.e., not in real time) computation of such algorithms as applied to digital data derived from information bearing signals, which was developed by Inventor to affect the foregoing, but which can also be independently practiced to great advantage.

In particular, the parent method comprises a class of techniques for doing so in a time-varying manner such that the artifacts introduced by the process or device involved become less noticeable to a human viewer than if standard techniques or algorithms are applied. It is this "greater than standard" variability over time, of the selection of information derived from the source signal and/or its arrangement into the information which will comprise the destination signal, that results in the improvement; and, in order to achieve an improvement, the variation over time must be of sufficient magnitude.

To distinguish patterns, techniques, processes or algorithms with variability sufficient to achieve a reduction in perceptual artifacts, from those which do not reduce (and may even increase) such artifacts, the words complex or complexly will be occasionally used herein to modify terms such as sampling pattern, time variation or time-varying STS (Spatial Temporal Signature, described below); and the words complex or complexity (sometimes used with variation) will be occasionally used to point out inventive techniques which can be used to achieve a sufficient magnitude of variation for effective practice.

Examples of "complex variable STS" or "complexity" when used to describe a variable STS or sampling pattern herein comprise, singly or in combination: rectangular (M×N) multi-pixel cells with a sampling scheme that decimates information significantly less than by a factor of M×N for a particular frame; multi-pixel cells that are non-rectangular; multi-pixel cells where more than a single pixel is sampled for a particular frame; pseudo-random and/or non-contiguous multi-pixel cells; distributions of multi-pixel cells of non-uniform size or shape over an image, or from frame to frame; multiplication weights for information points not equal to 1 (or a constant), or which change over a cell or frame, or from frame to frame; sampling schemes that utilize non-uniform time slices from frame to frame or over a frame; or as otherwise described herein. Thus, the word "complex", unless otherwise indicated, as used herein means intricate or sophisticated, and does not refer to numbers comprising real and imaginary parts.

The intended practitioner of the present invention is someone who is skilled in designing, implementing, integrating, building, creating, programming or utilizing processes, devices, systems and products, such as described in the first paragraph of this disclosure. That is, one skilled in the art required to practice the instant invention is capable of one or more of the following: design and/or construction of devices, systems, hardware and software (i.e., programming) for motion picture and television production, motion picture and television post production, signal processing, image processing, computer graphics, and the like. That is, motion picture and television engineers, computer graphic system designers and programmers, image processing system designers and programmers, digital software and hardware engineers, communication and information processing engineers, applied mathematicians, etc.

Those skilled in the art know how to accomplish such tasks as to: design and construct devices, design and integrate systems, design software for and program those devices and systems, and utilize those devices and systems to create information product, which devices and systems transfer and/or transform information derived from image streams. Such devices and systems comprise well known digital or analog electronic hardware, and software, components. The details of accomplishing such standard tasks are well known and within the ken of those skilled in these arts; are not (in and of themselves) within the scope of the instant invention; and, will be referred to but not described in detail in the instant disclosure.[1]

Rather, what will be disclosed are novel algorithms for selecting and arranging the information transferred or transformed by those systems, devices and processes; or the selection and arrangement of information comprising various information products such as magnetic or optical media containing, or transmissions of, information bearing signals; as well as a method and system for the off-line (i.e., not in real time) computation of such algorithms as applied to digital data derived from information bearing signals, which may be used to affect the foregoing or independently to great advantage. Disclosed will be what one skilled in the art will need to know, beyond that with which he is already familiar, in order to implement the instant invention. These algorithms and system designs will be presented by description, algebraic formulae and graphically, indicating how information data points or "pixels" are to be selected from data derived from a first information signal, and arranged, manipulated and/or combined to create the pixels or data points that will then comprise a second information signal; as is standard and frequent practice in the field of motion picture and television engineering.[2]

These descriptions, formulae and illustrations are such as to completely and clearly specify algorithms which may be implemented in a straightforward manner by programming a programmable computer imaging device such as a frame buffer.

For example, the programmable frame buffers (some with onboard special-purpose microprocessors for graphics and/or signal processing) suitable for use with personal computers, workstations or other digital computers, along with off-the-shelf assemblers, compilers, subroutine libraries, or utilities, routinely provide as standard features, capabilities which permit a user to (among other tasks): digitize a frame of a video signal in many different formats including higher-than-television resolutions, standard television resolutions, and lower-than-television resolutions, and at 8- 16- 24- and 32-bits per pixel; display a video signal in any of those same formats; change, under program control, the resolution and/or bit-depth of the digitized or displayed frame; transfer information between any of a) visible framestore memory, b) blind (non-displayed) framestore memory, and c) host computer memory, and d) mass storage (e.g., magnetic disk) memory, on a pixel-by-pixel, line-by-line, or rectangle-by-rectangle basis.[3]

Thus, off-the-shelf devices provide the end user with the ability to: digitize high-resolution video frames; access the individual pixels of those frames; manipulate the information from those pixels under generalized host computer control and processing, to create arbitrarily processed pixels; and, display lower-resolution frames, suitable for recording, comprising those processed pixels. These off-the-shelf capabilities are sufficient to implement an image processing system embodying the information manipulation algorithms or system designs specified herein.

Similarly, higher performance and throughput (as well as higher cost and more programming effort), programmable devices, suitable for broadcast or theatrical production tasks, provide similar and much more sophisticated capabilities, including micro-coding whereby image processing algorithms can be incorporated into general purpose hardware, are available as off-the-shelf programmable systems.[4]

Additionally, specialized (graphic and image processing) programmable microprocessors are available for incorporation into digital hardware capable of providing special-purpose or general-purpose (user-programmable) image manipulation functions.[5]

Further, it is well known by those skilled in the art how to adapt processes that have been implemented as software running on programmable hardware devices, to designs for special purpose hardware, which may then provide advantages in cost vs. performance.

In summary, the disclosure of the instant invention will focus on what is new and novel and will not repeat the details of what is known in the art.

Additionally, in the disclosure, a number of specific processes, devices or systems into which the algorithms of the instant invention can be incorporated, and applications to which the algorithms of the instant invention can be applied, will be pointed out. The intended practitioner of the instant invention is already skilled in the art of: building and/or programming some one (or more) of these devices; integrating and/or programming for some one (or more) of these systems; implementing (and/or utilizing to create information product) some one (or more) of these application systems; or, designing processes and devices to manipulate information that has been modified by random noise or some specified process in order to counteract that manipulation to some degree, including encoding, decoding, reconstruction, compression and decompression.

As such, the intended practitioner has within their skill in the art the knowledge to design and create and/or use such devices, processes or systems which "push pixels around" from some first or source information bearing signal, in a specified manner, to create a second or destination information bearing signal.

Examples include, without limitation: special purpose hardware or programmable devices that permit the implementation of specific or arbitrary image processing functions (for example, image filtering, blurring, sharpening, warping, zooming, sizing, tilting, compositing, wiping, keying, matting, texture mapping, colorization[6], posterization, etc.); and, hardware devices that transfer or transform information, including image streams, from a source form to a destination form (encoders, decoders, cameras, recorders, players, displays, switchers, timebase correctors, noise reducers, compressors, decompressors, modulators, demodulators, etc.).

The intended practitioner is already in command of the knowledge required to design and build such devices and application systems that select, arrange and manipulate the pixels of image streams, in various previously specified manners. What is provided herein is the specification for a novel manner for selection, arrangement and manipulation of the pixels comprising such image streams. What is claimed as inventive are these algorithms and/or the incorporation of the novel algorithms into an otherwise standard device.

For example, Inventor's own film colorization system (U.S. Pat. No. 4,606,625) discloses a system comprising all the elements needed to input an image stream, process it by applying colorization and other digital filtering algorithms, and output a processed image stream. Replacing the colorization process or algorithm element of that prior invention with some one of the algorithms herein would result in a system for practicing the encoding envisioned herein on an information bearing signal derived from motion picture film or video.

Additionally, in the disclosure, it will be pointed out that a number of the parameters (e.g., the set five weights Ka, Kb, Kc, Kd and Kx for the 4+1:1 pattern) can be varied, and may be adjusted or "fine tuned". It is common practice for users of television imaging systems to adjust or "fine tune" operating parameters via physical controls or data entry. For example, with a computer image processing capability (such as those provided with computer paint systems or special effects systems—e.g., digital filters that blur, sharpen, colorize, posterize, size, stretch, warp or otherwise manipulate an image or image stream) it is common practice for a practitioner to adjust various parameters that control the processing results via numeric keyboard input, or by physical or graphic controls. Considerable time may be spent making adjustments to the process, for any particular image input to the system, to achieve the desired results. The determination of what constitutes such desired results, and when those goals have been adequately approximated are, in the motion picture and television industry, most often a matter of subjective artistic taste; what one practitioner (or, more importantly the creative director to whom he reports) may deem successful, might be entirely unacceptable to another team. The specific adjustments made, will vary from case to case and will depend upon both the characteristics of the source material and the results hoped for after processing. How the system parameters should be adjusted is often not known ahead of time. Parameters are adjusted until a desired result is achieved or approximated.

Further, some image processing systems, such as Inventor's own film colorization system (U.S. Pat. No. 4,606,625) permit the application of algorithms with separately adjusted parameters (such as color specification or digital filtering parameters) to be applied to distinct areas of images in an image stream. Typically (in Inventor's systems) parameters are specified and adjusted in a small percentage of images from a moving sequence; the computer being capable of interpolating the practitioner's instructions for the intervening frames. Thus, it is not only common practice to fine tune parameters for a particular image, but also for individual areas of a given image.

Further still, it is common practice to "color correct" each individual scene of a motion picture film as it is printed, or transferred to video. Considerable time and effort, by highly skilled practitioners, is spent adjusting the parameters separately for individual scenes to achieve a desired overall "look".

Thus, in commercial applications of motion picture and television image manipulation processes, large amounts of time, effort and expense are expended in experimenting with the adjustment of operational parameters in an effort to achieve, as closely as reasonable, a desired result. And, this may be done for individual images, image sections, or motion scenes.

One of the major applications intended for the instant invention is the incorporation of the algorithms disclosed herein into a film chain (a film to video transfer device). Such transfers are an important and costly part of the television motion picture industry. Much time and effort is expended in achieving desired and artistic results. And, in particular, as described above, the scene-by-scene color correction of such transfers is common practice. Further, such transfer from film to video can be accomplished on an off-line, frame-by-frame basis, with the accompanying image processing components taking an arbitrarily large amount of time to accomplish the computations required for encoding a particular film frame to a particular video frame.

Thus, in the instant disclosure, it will be suggested that practitioners make adjustments to the operational parameters of the disclosed algorithms in order to better achieve desired results. Further, it will be suggested to such practitioners that such individual adjustments may be applied to images or image portions exhibiting different characteristics.

Commercial black & white and, later, color television has been available since the 1940s. American and Japanese systems offer 525 line frames, 30 times each second, while most European systems offer a higher resolution 625 line frame but run at a frame rate of 25 per second. Higher resolution military and laboratory video systems exist and, recently, a commercial high definition television standard (HDTV) has been developed to improve delivered image quality.[7]

In the US, motion picture film is projected at 48 frames per second (FPS) by showing each of 24 pictures twice. Recently, a system was developed by Douglas Trumbull called Showscan. It provides 60 FPS, with 60 pictures each shown only once, to improve visual quality.

When color was added to US black & white television, it was decided to adopt a "compatible" system, which enables black & white sets to receive color television signals and display them in black & white, while color sets display the same signals in color. Similarly, it has been suggested that the HDTV signal be compatibly receivable by standard televisions displaying standard resolution pictures, as well as by HDTV receivers. HDTV provides both more video lines and more pixels (from PICture ELements: visual data points) per line. It has been suggested that the standard television channels may be used to transmit a "compatible" standard resolution signal while a second channel (not receivable by a standard television) be used to transmit the "inbetween" higher resolution information. However, HDTV may also display a wider picture when compared with standard television. Inclusion of the extra "side strips" in a compatible broadcast system has been one of the main problems.

It is established practice to transmit motion picture film, which has a much higher resolution and a different frame rate, over a broadcast television channel by use of a film chain. Essentially a motion picture projector coupled to a television camera, the film chain synchronizes the two imaging systems. In newer film chain systems the video camera has been replaced by a digital image sensor and digital frame store. In the US, each video frame consists of two interleaved video fields, resulting in 60 fields per second. US film runs at 24 frames per second. This results in a ratio of 2.5 video fields per film frame. Practically, this is achieved by alternating 3 repeated video fields and 2 repeated video fields for alternate film frames. The spatial resolution of the image is reduced by the characteristics of the video camera.

It is also established practice to generate synthetic television signals (without a camera) by using electronic devices such as character (text) generators, computer graphic systems and special effects generators.

Recent developments in home televisions and VCRs include the introduction of digital technology, such as full-frame stores and comb filters.

There exist many techniques for bandwidth compression of electronic signals, a number of which have been applied to television systems. These are particularly useful for transmitting images from space probes or for satellite transmission, where resources are limited.

The off-line, or frame-by-frame, recording of frames computed by computer animation programs is a well-known standard practice. Off-the-shelf hardware and software exist that permit both low- and high-end graphic systems to commit such images to film or video.[8]

DESCRIPTION OF INVENTION

The instant invention relates to a method of signal encoding that is particularly useful for preparing a high-definition television signal for transmission over a channel intended for lower resolution signals. It can also be used to improve the perceived quality of television systems, or for other purposes.

In brief, the invention comprises a system for selecting a subset of information to be transmitted, from all the information in a frame, and for varying the parameters of selection from frame to frame. This results in the reduction of transmitted information, and improved perception on the part of the viewer when compared to non-varying selection schemes. In addition, techniques and systems to accomplish the off-line (i.e., not in real time) computation and recording of such algorithms as applied to digital data derived from information bearing signals are described, to affect the foregoing, but which also can be independently practiced to great advantage.

Theory of Operation:

The basis of the instant invention is that the human visual system is capable of, and sometimes even works better by, reconstructing information that is presented over time.

A simple example of this involves a picket fence. If a viewer looks fixedly through a picket fence, about half the scene will be hidden from view and the pickets will be clearly defined. However, if the viewer shifts the head back and forth, or walks briskly by the fence, the perception will be of seeing the entire scene, even though half the scene will be missing at any given instant. The pickets will also become less noticeable. The human eye/brain system is capable of reconstructing the scene from the stream of partial views and of disregarding the sampling scheme imposed by the (relatively moving) pickets.

In the parlance of this application, both these cases constitute bandwidth compression (half the scene is hidden at all times); but, the fixed view is a static STS, and the moving perspective view is a variable STS. Thus, the eye is capable of reconstructing information presented through a varying sample window.

Other aspects of human vision indicate that varying information is preferable to static information. As described above, repeating identical information to the eye, as with theatrical motion picture film projection, creates the perception of muddiness or opacity. Certain structures in the retinex, such as edge detectors and motion detectors, only work in differential mode. That is, they do not work when presented with information that is temporally or spatially uniform. Another (although, longer term) phenomenon is visual fatigue or after-imaging. The receptor elements in the eye become exhausted by looking at a fixed image. The scene will eventually become almost invisible (if the view remains constant) and a negative of the scene will be perceived upon finally looking away.

The human eye vibrates with a continuous tremor of 30 to 80 Hz. during its normal function. The retinex is able to reconstruct a stable detailed image from this vibrating input. It may, in fact, yield a more detailed image than could be constructed from an absolutely stable eye and may help prevent the perception of the structure of, or defects in, the retinex itself.[9]

A similar situation results from the way in which motion picture film is manufactured and used. Film images are made up of a random distribution of photosensitive particles collectively called "film grain". When blown-up on a large screen the grain structure would be more easily seen, however, because the distribution changes from frame to frame the grain structure is generally not perceived. There are two ways that still images are added to motion picture presentations. With one technique a still scene is filmed on a number of film negative frames. Each has a different grain structure and, thus, when the sequence is projected (or viewed on a video monitor) the film grain structure is not noticed. The other technique calls for "step printing" the same film negative on many frames of the print to be projected (or to repeatedly scan the same film frame in a film chain). In this case the same film negative frame, with the same grain structure, is viewed repeatedly and the grain structure becomes more noticeable. The frames of the motion picture print also have grain structure, however, since this structure always changes (unless the projector jams or is stopped) the print film grain structure is not noticed.

The tremor function provides variation to the STS of human vision. Thus, the retinex may be better suited to deal with variable STSs than static.

The retinex has the ability to reconstruct a scene from bits and pieces spread over space and time. It is possible to take advantage of this ability by presenting a succession of moderate bandwidth pictures (subsets of full-definition images), taken through varying sample windows, and to have the retinex reconstruct a higher resolution scene.

Thus, for some embodiments, the compressed transmitted data points will be directly displayed on a monitor of resolution that is comparable to the transmission channel. Reconstruction, or collection, will occur in the retinex. Improved perception will result, when compared with standard transmission over the same channel and display. Thus, the technique may be used to improve perception of material transmitted for standard systems. It is only the camera and/or transmission parts of the system that would be replaced; standard reception and display elements would be used in this embodiment. This is in marked contrast to most bandwidth compression techniques, which utilize complex coding schemes that require complex decoding before display. For example, an image compressed by run-length encoding would appear as gibberish if the data were displayed directly, without proper decoding.

Other embodiments will present the results on a higher definition (compared to the channel) display. The "holes" between the transmitted points may be smoothed over by interpolative techniques, or intermediate data may be (approximately) "reconstructed" by computation.

Figure 1:
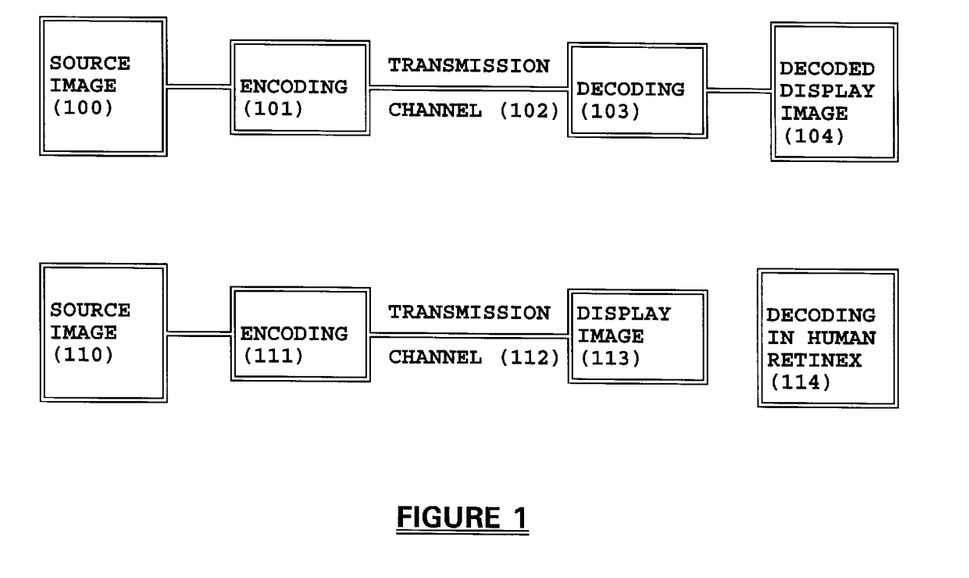
FIG. 1 depicts in the top configuration a standard encoding/decoding bandwidth reduction scheme. The bottom configuration depicts one class of embodiments where decoding occurs after display, as viewed, in the human eye/brain (retinex).

Referring to FIG. 1, the top configuration (100–104) depicts a standard encoding/decoding (101/103) bandwidth reduction scheme. The bandwidth of the source (100) and display image (104) are equal and higher than the bandwidth of the channel (102).

The bottom configuration (110–114) depicts one class of embodiments of the instant invention. The bandwidth of the source image (110) is higher than both the channel (112) and the display (113) which are comparable to each other. Decoding (114) occurs after display (113), as it is viewed (114), and it is only in the retinex (114) that the image is reconstructed.

The goal of most bandwidth compression schemes is to "squeeze" a given information signal into a smaller channel. A main goal of the instant invention is to "squeeze" (111) a larger picture into a given channel. Although this may at first sound as a semantic difference only, there is a significant practical difference.

Broadcast television in the US is a "given channel" that is unlikely to change for the foreseeable future. Bandwidth compression schemes that would allow the use of a smaller transmission channel (102) and require complex decoding at destination (103) could not be used with the many millions of existing home receivers (e.g., 104). The bottom configuration (110–114) shown in FIG. 1 requires no decoding equipment prior to display (113); decoding is accomplished in the human eye/brain (114). Therefore, it can be used with existing distribution and reception/display equipment (113).

It should also be noted that the "channel" (112) shown in the bottom part of FIG. 1, can incorporate a standard encode-transmit-decode system (101–102–103), as shown above. In this way, the varying STS scheme (e.g., 111) will function as a pre-selection or thinning function, prior to applying some other compression algorithm (e.g., 101), such as run-length encoding, delta encoding, etc.

Static Sampling Schemes:

The visual artifacts of film and video systems are perceivable because the STS of each system is constant. Many times each second, images are presented to a viewer. While these image streams approach viewing a real scene, they represent only a small subset of the available information. The way in which the subset of information is selected remains constant, frame after frame after frame, while the content of each frame is different. In this way the "shape" of the STS is re-enforced by being superimposed over many different images. Perceived visual anomalies result.

Figure 2:
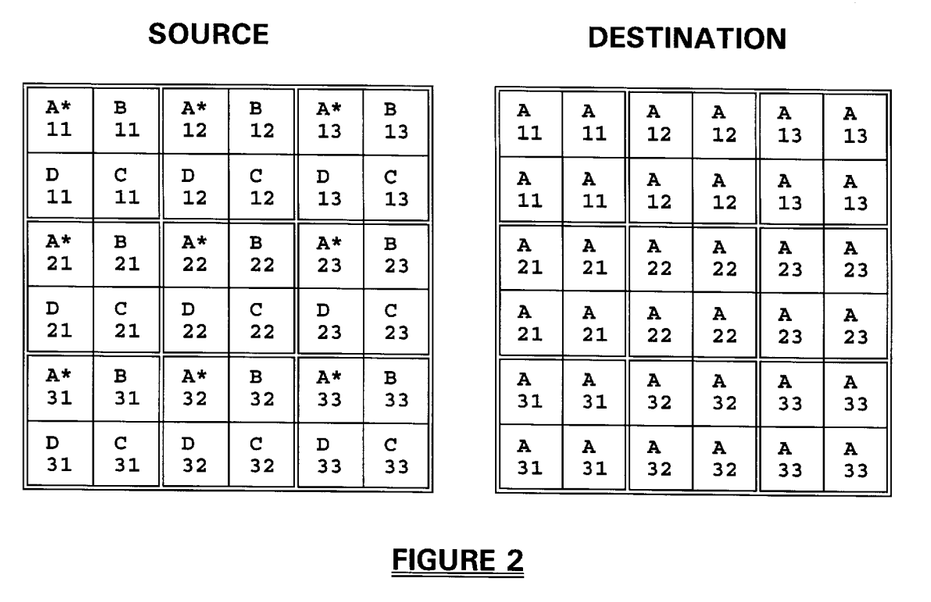
FIG. 2 depicts selection of a subset of a relatively high-resolution television signal for transmission over a lower bandwidth channel, where the upper left corner element (A) of each two-by-two pixel cell, is transmitted (*) for every cell, in every frame of the source image.
Figure 3:
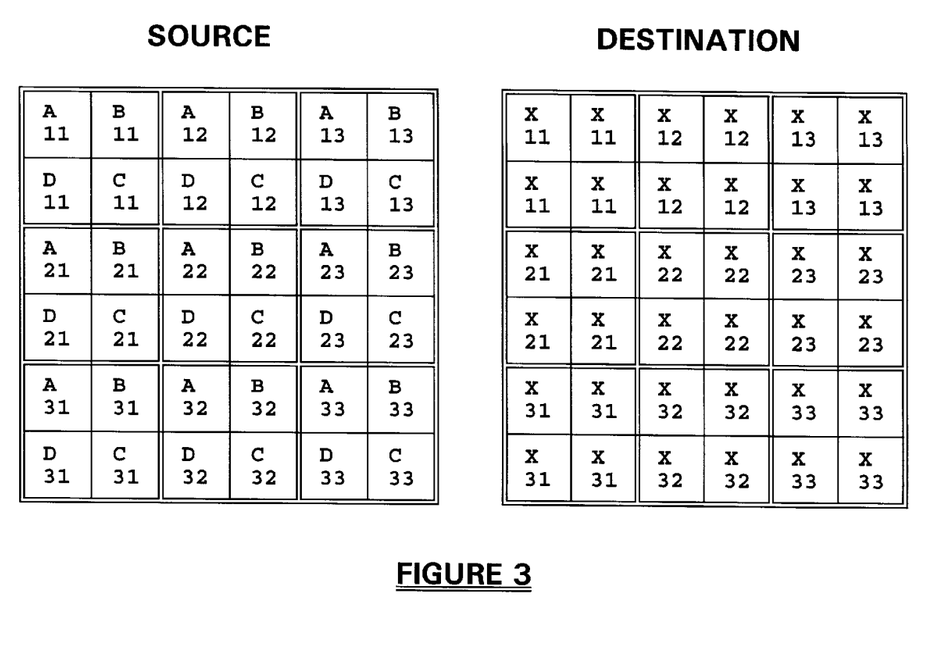
FIG. 3 depicts selection of a subset of a relatively high-resolution television signal for transmission over a lower bandwidth channel, where all four picture elements from each two-by-two cell in the source image are averaged, as by a low-pass digital filter, to derive the pixels of the destination display cell noted by X, in every frame of the source image, FIGS. 4A through 4D each depict a point sampling scheme, similar to FIG. 2; but for each figure, a different pixel from the two-by-two cell is sampled, indicated by a (*). These four types of sampling would be alternated in a cycle of four.
Figure 4A:
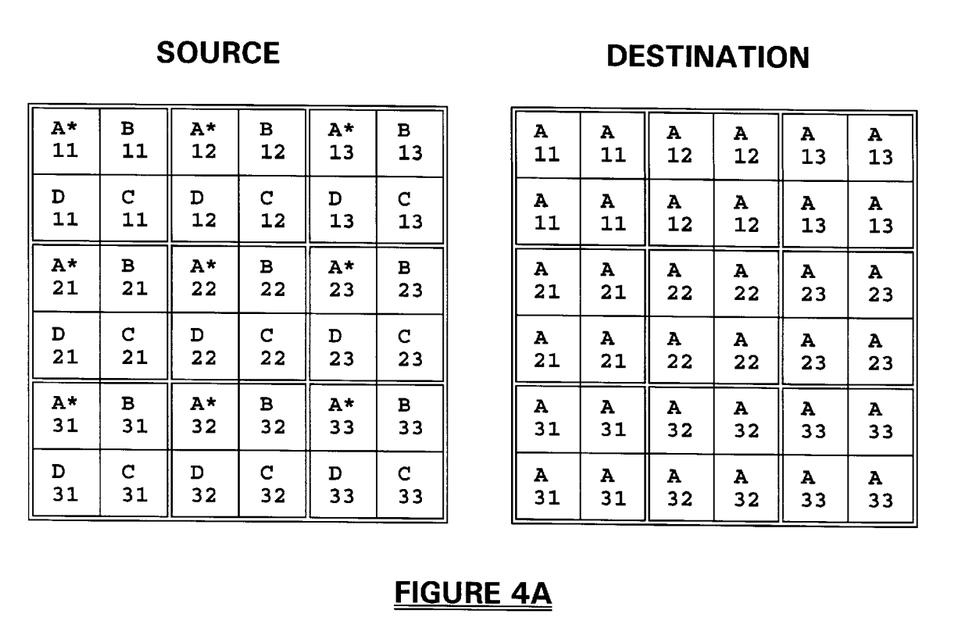
Figure 4B:
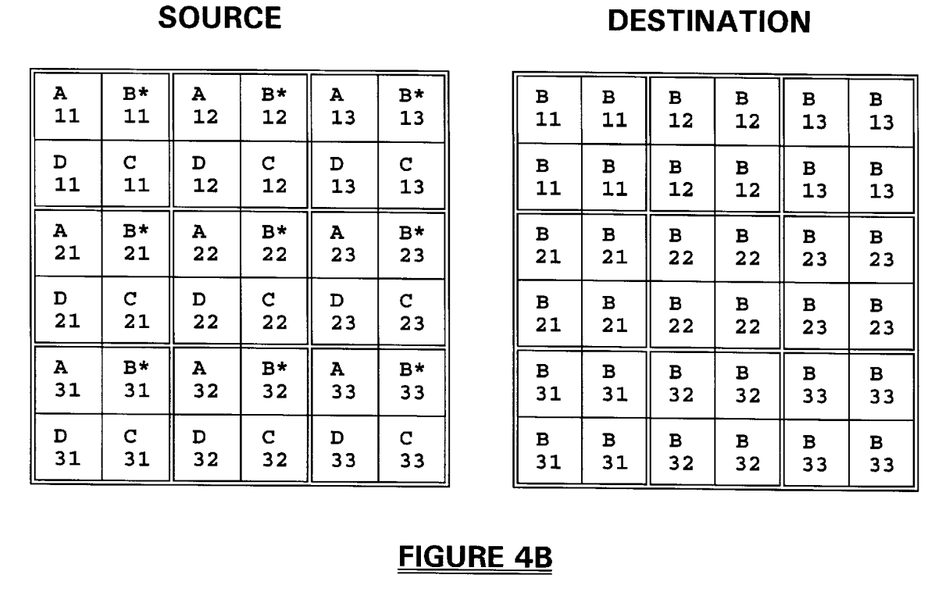
Figure 4C:
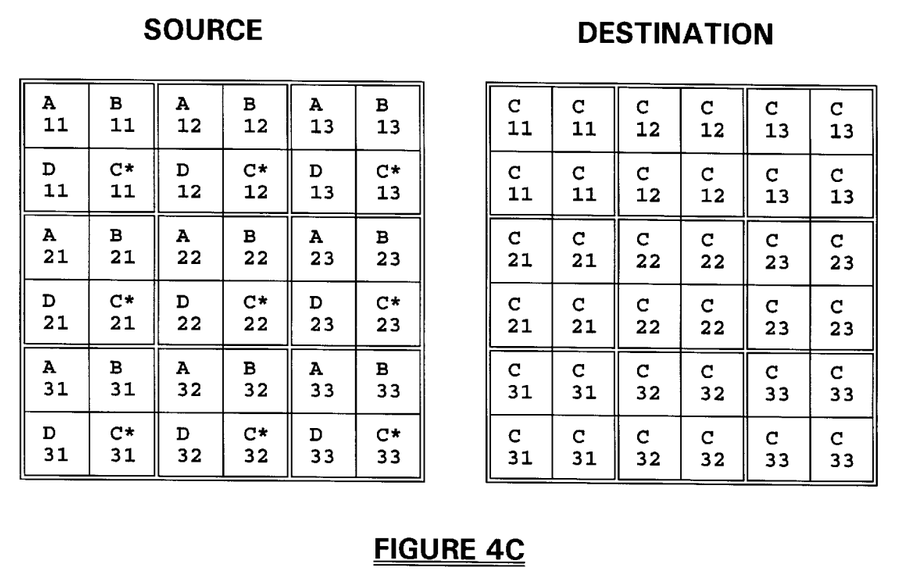
Figure 4D:
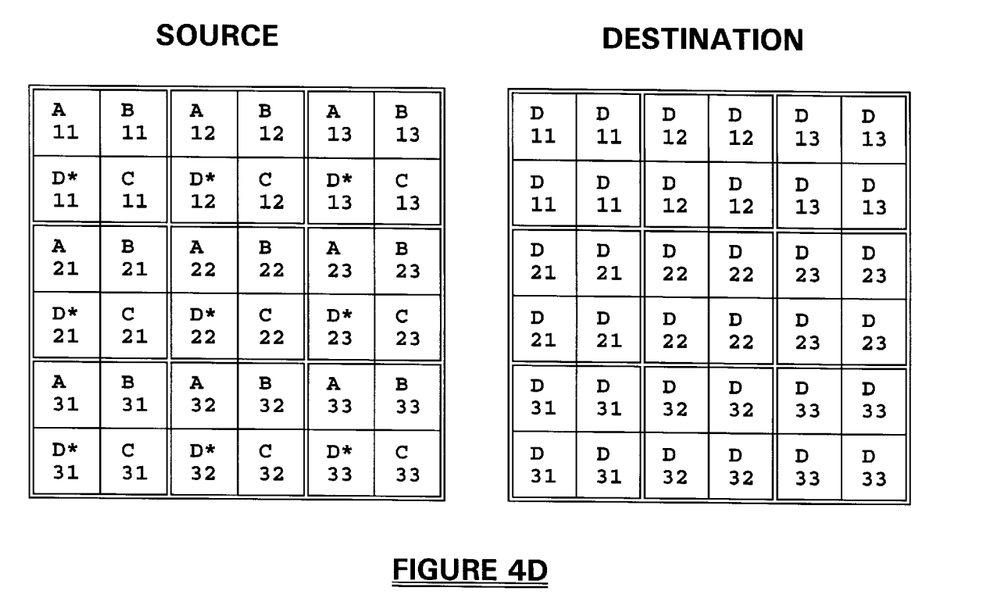

In order to select a subset of a relatively high-resolution television signal for transmission over a lower bandwidth channel, two straightforward approaches are depicted in FIG. 2 and FIG. 3.

In both cases, the reduction is by a factor of four; by half in both the horizontal and vertical directions. Two-by-two cells of pixels are labeled with subscripts representing the row and column of the cell. Within the cell, individual pixels are labeled A, B, C and D.

In the FIG. 2, the upper left corner element (A) of each two-by-two pixel cell, is transmitted (*) for every cell, in every frame of the source image. This pixel value is used to reconstruct the entire destination cell in the destination image. Picture details that fall in pixels labeled B, C or D do not get transmitted or displayed at all. As a small visual detail moves across the screen it would pop on (as it passes A*) and off (as it passes B, C or D).

In FIG. 3, all four picture elements from each two-by-two cell in the source image are averaged, as by a low-pass digital filter, to derive the pixels of the destination display cell. The average of A, B, C & D is denoted by X. Here individual small details are lost as they are averaged with the neighboring three pixels.

Both approaches exhibit defects. In the first, small details pop on and off, in the second, small detail is lost in the blur. This is because the method of selecting the subset of information—the STS—is constant from frame to frame. The "shape" of the static STS is re-enforced by viewing changing content upon which the same STS is repeatedly imposed.

Varying the STS:

Although each is unique, the successive frames of a standard film or video presentation each have much redundant information in common with their neighbors. The STS of the present invention varies from frame to frame. By this scheme, the differences in the STS that is applied to successive frames is comparable to, or will even exceed, the differences in the content of successive frames. Therefore, the shape of the STS will not be re-enforced from frame to frame. Thus, sampling artifacts will be obscured, as they change from frame to frame, and the perception of visual anomalies, resulting from the overall varying sampling scheme, will be minimized.

The reader is directed to consult the parent application, of which the instant application is a continuation-in-part, for further details.

Variable Algorithm Over Image Frame:

As described above, the varying STS principle may be implemented in numerous embodiments, which may be fine tuned for images or image sequences with different characteristics. For example, the "accumulation mode" described above may improve visual quality for image sequences that have little or no movement, for a period, or for images of text or graphics. It is also possible that certain images or image sequences will have different characteristics in different areas and that the shape or position of those areas will change, over time, from frame to frame.

Many image analysis techniques now exist and other useful techniques may continue to be developed. Similarly, techniques and algorithms now exist, and may later be developed, that can be used to encode area shapes, edges or boundaries. These algorithms and techniques can be used to analyze and specify various areas of different image characteristics. The analyses can be made on a single frame basis, or by comparing progression or change over two or more frames.[10]

Once a frame is analyzed and separated into multiple areas of different characteristics, different versions of the encoding technique can be used for those several areas. These variations of the encoding technique can be designed so that the encoded image can be decoded using a uniform decoding technique over the whole image.

Alternately, a multiplicity of fine tuned decoding algorithms can be used on different areas of the image. The shapes of the decoding areas need not be identical to the encoding areas. The different decoding areas may be determined by analysis at the destination display or, the decoding areas may be derived from area specification information, to be included with the image data in the transmitted signal or transmitted separately.

An image can be displayed with several decoding algorithms, even if it were encoded with a single uniform algorithm. For example, although an image stream were encoded uniformly, the accumulation mode algorithm can be applied to limited areas (with little or no movement, or containing text or graphic information), while elsewhere, information is discarded as soon as it has been displayed.

The method of specifying area shape can be varied depending upon: the encoding/decoding algorithm, image characteristics, the characteristics of camera, transmission or display equipment, or, constraints imposed by transmission bandwidth, computing power or time. For example, areas can be limited to groups of rectangles, triangles, polygons, or other shapes, or may be freely specified on any pixel, or multi-pixel cell, boundary. Limits can also be placed on the number of distinct areas in an image(s), or on the maximum change of area specification from frame to frame.

If the constraints of image complexity, time or computing power do not allow for real-time analysis and/or separation of images into areas, analysis can be done off-line[11] for certain applications. For example, a relatively long time may be spent on the analysis and encoding of the frames of a motion picture film, prior to transmission. The encoded results, perhaps with area specifications would then be stored on videotape (or other medium) for real-time playback, transmission, and display, at a later time. Alternately, frames can be computed, transmitted and recorded off-line, for real-time playback at a later time.

Figure 5:
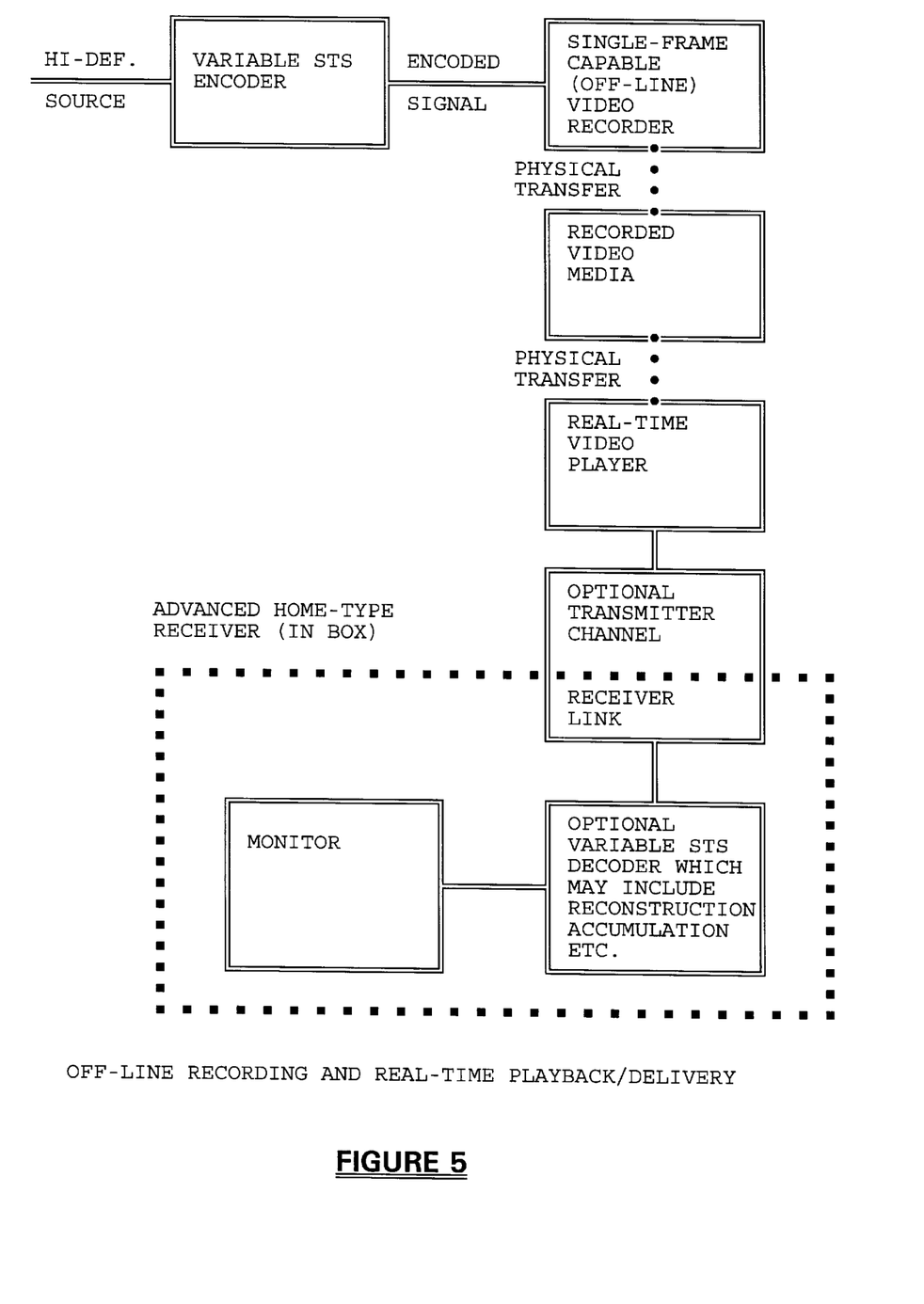
FIG. 5 depicts an off-line recording and real-time playback/delivery system.

FIG. 5 depicts the "off-line recording" process described above. The dotted box in FIG. 5 indicates which system elements one might expect to find combined in a typical "advanced television receiver" which are currently available at least in laboratory settings.

For interlaced video systems, with frames consisting of two interleaved fields, each containing only odd or even lines, the grid can be overlaid on the whole frame, or on each field separately.

Standard interlaced television cameras only scan half of the possible raster lines for each field. For some embodiments of the instant invention, it will be necessary to use cameras that scan all lines of an interleaved frame in one field time, or can even scan at a rate higher than one full frame for each field. One "field's worth" of information will then be selected, encoded and transmitted according to the techniques described herein. For some applications, e.g. a film chain, it will be possible to use a very high resolution camera that scans slower than real-time. The encoded frames can then be recorded on videotape, or some other medium, for real-time playback and/or transmission.

FURTHER DISCUSSION

The essence of this invention, the off-line computation and/or recording of images derived from the parent method (or any other similar bandwidth compression or image processing algorithm) is not of the type usually subject of patent applications. That is, the invention is not a novel process, device or system. Rather, the inventive matter comprises the recognition of a problem not previously addressed, and the application of standard, well-known or off-the-shelf techniques and devices to solve that problem, and practice a new method. Thus, at a minimum this would constitute a new use of the previously know technology.

In particular, as already discussed, the off-line, or frame-by-frame, recording of frames computed by computer animation programs is a well-known standard practice. Off-the-shelf hardware and software exist that permit both low- and high-end graphic systems to commit such images to film or video.[12]

The parent information manipulation methods, as has been noted above, are unusual in that, for at least some embodiments, an image stream encoded by this process may be displayed without any further processing; or, in other embodiments, with a minimum of decoding.

Standard bandwidth compression or encoding schemes require complicated special-purpose real-time hardware for encoding/compression and decoding/decompression. Such systems are most often used for reducing transmission bandwidth requirements of industrial, scientific or broadcast television (between facilities, not into the home) transmissions. As such, having expensive, hardware-driven solutions at both ends is the norm and is economically practical.

That, in this country at least, HDTV transmission (NTSC-compatible or otherwise) into the home has not happened in the period since the filing of the grandparent application of the instant invention, is in large part because the proposed solutions are hardware-driven; and, the economic burden of replacing the end-user "infrastructure" (i.e., the millions of home receivers) has made such solutions impractical, even if replacing the far fewer transmission facilities would be practical.

Thus, with Inventor's techniques, one may consider low-cost display embodiments running on equipment of a cost and technology level comparable to current (as of 1987) consumer home video equipment or PC-class computers.

Such new possibilities, then, lead to the consideration to using such under-powered processors[13] (e.g., the IBM-PC) or equipment for the compression/encoding end of the process as well. These devices are drastically under-powered and inappropriate for the task at hand, as it is currently practiced in standard manner.

However, having a background in single-frame computer animation (often taking a large part of an hour to compute a single frame, even on mainframe computers such as the DEC VAX 11/780), Inventor realized that the compression/ encoding process might be similarly practiced off-line, with standard systems intended for accomplishing other tasks (e.g., computer animation) providing the ability to collect the computer frames in memory, on disk and, eventually committing them to videotape (or film). Such a frame-by-frame-compiled videotape may then be played back for normal speed (30 frame-per-second) display or transmission.

With standard encoding/decoding schemes, encoding/ compressing utilizing a low-cost under-powered system, with the intention of eventually decoding/decompressing on the required expensive real-time hardware system, would be counter to standard engineering practice in a commercial or laboratory setting; and, completely out of the question in a consumer situation.

However, with Inventor's encoding/decoding scheme, since the usable display of encoded/compressed information can be accomplished with no electronic decoding equipment at all required (the decoding being accomplished within the human visual system) low-cost encoding/compression systems become not only reasonable to consider, but a desirable companion to a "zero-cost" decoder. With such a paradigm, it is possible to put both the encoding/compression and decoding/decompression in the hands of end-users with consumer-grade computer and video equipment.

Inventor wishes to reiterate that he is not asserting that the processes of off-line computing or recording, or devices to accomplish same, are inventive, let alone his invention. What Inventor claims is the recognition of a new practice and the novel use for already extant technology. Specifically, Inventor claims the use of off-line computing and recording for the purpose of applying a bandwidth compression algorithm (either employing Inventor's time-varying STS schemes, or otherwise) to an information bearing signal (such as an HDTV video signal) to create an encoded/ compressed signal that may then be displayed or transmitted in real time.

Details of Off-Line Encoding Embodiment:

The above describes matrix algebra that would be embodied as high-speed special purpose hardware within a smart HDTV receiver, with the matrix coefficients most likely pre-computed and stored as data on a PROM.

Similarly a special purpose (or programmable) digital signal processing system may embody the underlying algebraic encoding functions for real-time encoding; for example, as might be insinuated between a high-definition camera and a transmitter or a recorder.

Alternately, as described above, the encoding may be done off-line (i.e., not in real time) and may then employ a low-powered general purpose processor, such as an IBM-PC, for computational purposes, suitably outfitted with one or two frame stores.[14] If the frame store is of such a type as may be programmed to display and digitize at different resolutions, then a single one may be used. Alternately, and more conveniently, a high-resolution digitizing frame store may be used in addition to a low-resolution display. This second approach will be assumed in the following discussion.

Under computer control, a source tape player will synchronize with the frame store to permit digitization of individual frames. (Alternately, these may be digitized on another system and imported via a communication line or removable mass storage device.)

Similarly, a destination tape recorder is synchronized to the output frame store for the single-frame collection of the processed frames.

While a high definition frame is in the high resolution frame store data from its individual pixels will be made available via a subroutine PIXELIN(x, y) where x represents a column and y a row; which returns a pointer to a three integer array where the integers represent red, green and blue values of the pixel respectively; or, returns a pointer to a (0, 0, 0) triple if x or y are out of range.

Similarly, data may be written to the low-definition frame store by a subroutine PIXELOUT(x, y, rgb) where x represents a column, y a row and rgb a pointer to a three integer array where the integers represent red, green and blue values of the pixel respectively.

The following computer subroutine, written in "C", SQUEEZE(p) where p is the phase, would be run on the host computer to affect the conversion of each frame. An overall control program would coordinate this subroutine with others that control the videotape machine interfaces. See FIG. 6 for a system diagram of this embodiment.

```
/*************************************************************
This "C" code fragment, the subroutine SQUEEZE, implements the
(4 + 1 ):1 encoding pattern as shown in FIGS. 6 through 11.
        squeeze(p) is the call to the code fragment where p is the
                  phase of the pattern, 1 through 4.
It is assumed that two low-level system specific subroutines exist.
PIXELIN will access, as input, the pixels of a high-resolution
image that is 2,000 by 2,000 pixels, upper-left origin of (0,0).
    pixelin(x, y) where x represents a column and y a row
    returns a pointer to a three integer array where
    the integers represent red, green and blue values
    of the pixel respectively; returns a pointer to a
    (0, 0, 0) triple if out of range.
PIXELOUT will access, as output, the pixels of a low-resolution
image that is 400 by 400 pixels, upper-left origin of (0,0).
    pixelout(x, y, rgb) where x represents a column, y a row
        and rgb a pointer to a three integer array where the
                    integers represent red, green and blue values of the
                    pixel respectively.
NOTE: This code has been written for clarity, not efficiency.
*************************************************************
/*************** BEGINNING OF SEQUENCE ****************/
squeeze(
        int p                 /* phase index */
    )
{
int x;                  /* high-resolution column index */
int y;                  /* high-resolution row index */
int wx, wa, wb, wc, wd;       /* digital weighting factors */
int i;                  /* low-resolution column counter */
int j;                  /* low-resolution row counter */
int k;                    /* rgb index */
int ax, bx, cx, dx;         /* column offsets for O-points */
int ay, by, cy, dy;         /* row offsets for O-points */
int *rgbx, *rgba, *rgbb, *rgbc, *rgbd;
                    /* pointers to input rgb pixel values */
int rgb[3];             /* holders for output rgb pixel values */
/* Set Digital Weighting Factors */
wx = 6;
wa = 4;
wb = 3;
wc = 2;
wd = 1;
/* Set Row & Column Offsets for O-Points for Correct Phase */
if(p = = 1)                      /* For Phase 1 */
{
ax = +2; ay = +1;
bx = -3; by = +1;
cx = +2; cy = -4;
dx = -3; dy = -4;
}
else if(p = = 2)                 /* For Phase 2 */
{
ax = -1; ay = +2;
bx = -1; by = -3;
cx = +4; cy = +2;
dx = +4; dy = -3;
```

Figure 6:
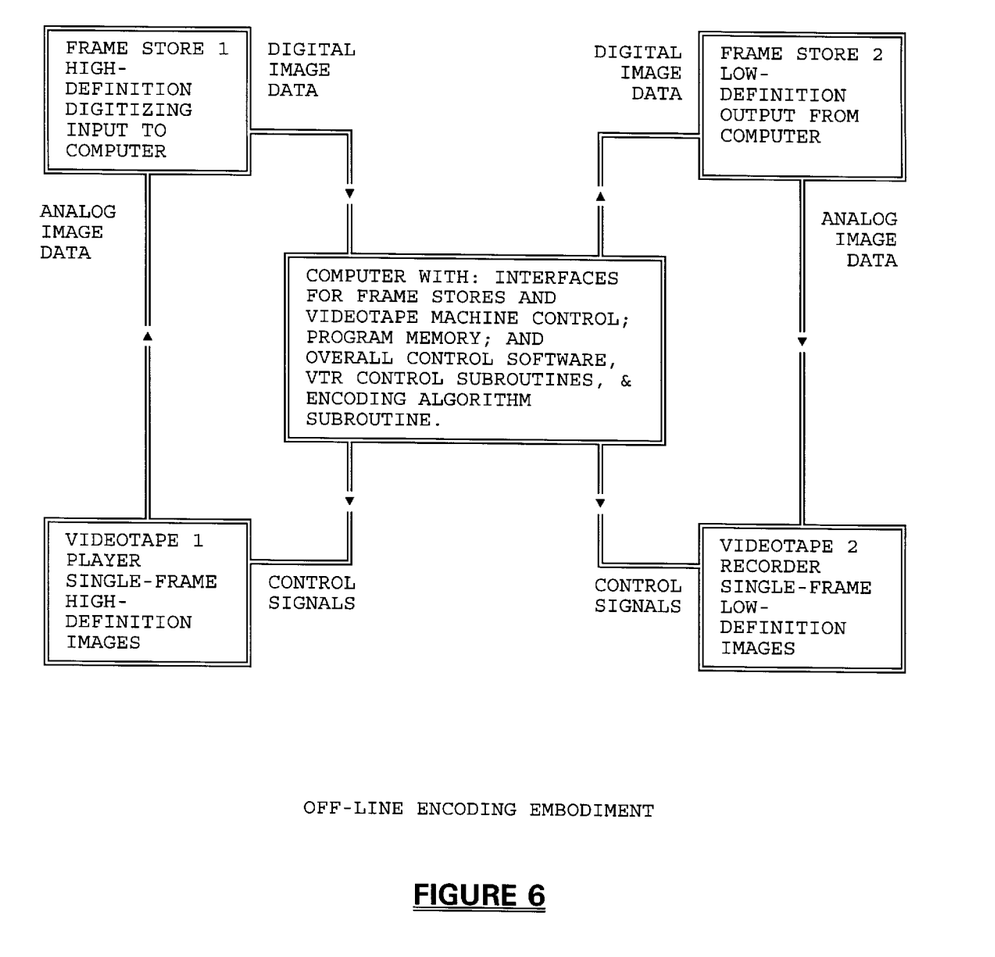
FIG. 6 depicts an off-line encoding embodiment of the instant invention.

-continued

```
}
else if(p = = 3)                /* For Phase 3 */
{
ax = -2; ay = -1;
bx = +3; by = -1;
cx = -2; cy = +4;
dx = +3; dy = +4;
}
else if(p = = 4)                /* For Phase 4 */
{
ax = +1; ay = -2;
bx = +1; by = +3;
cx = -4; cy = -2;
dx = -4; dy = +3;
}
else            /* Otherwise Return with Error Condition */
{
    printf("\nERROR: %d is not a valid phase (1-4).",p);
    return(-1);
}
/* Calculate low-resolution values from high-resolution data */
for(i=0; i<400; i+ +)           /* for 400 low-resolution rows */
{
x = i * 5 + 2;        /* calculate X-point x-coordinate */
for(j=0; j<400; j + +)          /* for 400 low-resolution columns */
{
y = j * 5 + 2;        /* calculate X-point y-coordinate */
rgbx = pixelin(x, y);       /* get pointer to X-point */
rgba = pixelin(x+ax, y+ay); /* get pointer to A-O-point */
rgbb = pixelin(x+bx, y+by); /* get pointer to B-O-point */
rgbc = pixelin(x+cx, y+cy); /* get pointer to C-O-point */
rgbd = pixelin(x+dx, y+dy); /* get pointer to D-O-point */
            for(k=0; k<3; k + +) /* calculate low-resolution r, g & b */
            {
            rgb[k] = *(rgbx+k) * wx
                + *(rgba+k) * wa
                + *(rgbb+k) * wb
                + *(rgbc+k) * wc
                + *(rgbd+k) * wd;
            rgb[k] /= 16;       /* normalize value */
            }
            pixelout(i, j, rgb); /* write out low-resolution pixel */
    }
}
/* Done - Return with OK Code */
    return(0);                  /* normal return */
}
/****************** END OF SQUEEZE ********************
```

The flows depicted in the software flow diagrams herein are exemplary, some items may be ordered differently, combined in a single step, skipped entirely, or accomplished in a different manner. However, the depicted flows will work. In particular, some of these functions may be carried out by hardware components, or by software routines residing on, or supplied with, such a component.

Similarly the systems depicted in the system diagrams herein are exemplary, some items may be organized differently, combined in a single element, omitted entirely, or accomplished in a different manner. However, the depicted systems will work. In particular, some of these functions may be carried out by hardware components, or by software routines residing on, or supplied with, such a component.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying figures shall be interpreted as illustrative and not in a limiting sense.

Now that the invention has been described, what is claimed as new and desired to be secured by Letters Patent is:

1. An improved process for modifying a first motion picture sequence utilizing a digital processing unit of a particular computational capacity, wherein the improvement comprises applying the following steps to each image of a multiplicity of images of said first motion picture sequence to create a multiplicity of images comprising a second motion picture sequence:

a. inputting into said digital processing unit an image of said first motion picture sequence as a first array of digital data; and, b. processing said first array of digital data by said digital processing unit to create a second array of digital data of reduced information content, wherein said processing is accomplished by an algorithm operating as software on said digital processing unit, and wherein the operation of said algorithm requires more computational capacity than available from said digital processing unit in order to accomplish said operation in the time allotted to an image of said second motion picture sequence during standard display at standard temporal resolution and, thus, said processing is accomplished in a time longer than said time allotted.

2. A process as in claim 1 wherein, in addition:

c. the multiplicity of second arrays of digital data of reduced information content are accumulated into an intermediate storage device in a manner suitable for subsequent output at said standard display at said standard temporal resolution.

3. A process as in claim 1 wherein, in addition:

c. the multiplicity of second arrays of digital data of reduced information content are recorded onto an information bearing medium in a manner suitable for subsequent playback at said standard display at said standard temporal resolution.

4. A process as in claim 2 wherein the temporal resolution of said first motion picture sequence and the temporal resolution of said second motion picture sequence are the same.

5. A process as in claim 3 wherein the temporal resolution of said first motion picture sequence and the temporal resolution of said second motion picture sequence are the same.

6. A process as in claim 2 wherein the geometric resolution of said first motion picture sequence is greater than the geometric resolution of said second motion picture sequence.

7. A process as in claim 3 wherein the geometric resolution of said first motion picture sequence is greater than the geometric resolution of said second motion picture sequence.

8. A process as in claim 2 wherein the temporal resolution of said first motion picture sequence is greater than the temporal resolution of said second motion picture sequence.

9. A process as in claim 3 wherein the temporal resolution of said first motion picture sequence is greater than the temporal resolution of said second motion picture sequence.

10. A process as in claim 2 wherein at least some of said images of said second motion picture sequence contain information derived from more than one image of said first motion picture sequence.

11. A process as in claim 3 wherein at least some of said images of said second motion picture sequence contain information derived from more than one image of said first motion picture sequence.

12. A process as in claim 2 wherein the temporal resolution of said first motion picture sequence is greater than the temporal resolution of said second motion picture sequence and at least some of said images of said second motion picture sequence contain information derived from more than one image of said first motion picture sequence.

13. A process as in claim 3 wherein the temporal resolution of said first motion picture sequence is greater than the temporal resolution of said second motion picture sequence and at least some of said images of said second motion picture sequence contain information derived from more than one image of said first motion picture sequence.

14. A computer program for modifying a first motion picture sequence to create a second motion picture sequence by the process of claim 2 comprising:
  a. an input software system component to control the input of images from said first motion picture sequence into a digital processing unit as a first array of digital data at a first geometric resolution;
  b. a processing software system component, for processing said first array of digital data to create a second array of digital data of reduced information content, embodying an algorithm that requires more computational capacity than available from the digital processing system component upon which said processing software system component is intended to operate, in order to accomplish said processing associated with a particular image of said first motion picture sequence in the time allotted to said particular image of said first motion picture sequence during standard display at standard temporal resolution; and,
  c. an output software system component to control the storage of said second array of digital data.

15. A system for modifying a first motion picture sequence to create a second motion picture sequence by the process of claim 3 comprising:
  a. an input system component for inputting images from said first motion picture sequence into a digital processing unit as a first array of digital data at a first geometric resolution;
  b. a digital processing system component for processing said first array of digital data to create a second array of digital data of reduced information content;
  c. a software system component operating on said digital processing system component, embodying an algorithm that requires more computational capacity than available from said digital processing system component in order to accomplish said processing associated with a particular image of said first motion picture sequence in the time allotted to said particular image of said first motion picture sequence during standard display at standard temporal resolution; and,
  d. an output system component for outputting said second arrays of digital data as a second motion picture sequence in a manner suitable for recording.

16. A product produced by the process of claim 2 and transferred to an information bearing medium.

17. A product produced by the process of claim 3 and recorded on an information bearing medium.

18. A product produced by the process of claim 5 and recorded on an information bearing medium.

19. A product produced by the process of claim 7 and recorded on an information bearing medium.

20. A process as in claim 3 comprising the additional step of:
  d. distributing said subsequent playback at said second temporal resolution via an information distribution system.

21. A product produced by the process of claim 20.

22. A process as in claim 1 wherein for said second motion picture sequence the improvement results in a perceived improvement in visual quality when compared with results achieved by the standard process wherein the operation of said digital processing unit on individual frames of said first motion picture sequence is limited to the amount of time allotted to said image of said first motion picture sequence during standard display at standard temporal resolution.

23. A process as in claim 1 wherein for said second motion picture sequence the improvement results in an encoded second motion picture sequence that requires less computational capacity to decode when compared with results achieved by the standard process wherein the operation of said digital processing unit on individual frames of said first motion picture sequence is limited to the amount of time allotted to said image of said first motion picture sequence during standard display at standard temporal resolution.

24. A process as in claim 1 wherein the bandwidth of said first motion picture sequence is greater than the bandwidth of said second motion picture sequence.

25. A process as in claim 1 wherein said processing of step b. comprises the selection of different subsets of data points from said first array of digital data for at least two images of said first motion picture sequence.

26. A process as in claim 1 wherein said processing of step b. comprises the selection of different subsets of data points from said first array of digital data for at least three images of said first motion picture sequence.

27. A process as in claim 1 wherein said processing of step b. comprises the combination of information from a more than one data point of said first array of data points to create a single data point of said second array of data points for at least some of the data points of said second array of data points.

28. A process as in claim 1 wherein said processing of step b. comprises the application of the (4+1):1 pattern of data selection.

29. An improved process for modifying a first motion picture sequence utilizing a digital processing unit of a particular computational capacity, wherein the improvement comprises applying the following steps to each image of a multiplicity of images of said first motion picture sequence to create a multiplicity of images comprising a second motion picture sequence:
  a. inputting into said digital processing unit an image of said first motion picture sequence as a first array of digital data;
  b. processing said first array of digital data by said digital processing unit to create a second array of digital data of reduced geometric resolution wherein said processing is accomplished by an algorithm operating as software on said digital processing unit, and wherein the operation of said algorithm requires more computational capacity than available from said digital processing unit in order to accomplish said operation in the time allotted to an image of said second motion picture sequence during standard display at standard temporal resolution and, thus, said processing is accomplished in a time longer than said time allotted; and,
  c. recording onto an information bearing medium in a manner suitable for subsequent motion picture playback at standard display at standard temporal resolution said second array of digital data as an image of said second motion picture sequence.

30. An improved system for modifying a first motion picture sequence to produce a second motion picture sequence utilizing a digital processing unit of a particular computational capacity, comprising:
  a. a system component to input into said digital processing unit an image of said first motion picture sequence as a first array of digital data;

b. a system component comprising said digital processing unit;

c. a software system component capable of processing said first array of digital data to create a second array of digital data of reduced geometric resolution, wherein said processing is accomplished in said digital processing unit, and wherein the operation of said software system component requires more computational capacity than available from said digital processing unit in order to accomplish said processing in the time allotted to an image of said second motion picture sequence during standard display at standard temporal resolution and, thus, said processing is accomplished in a time longer than said time allotted; and, d. a system component to record onto an information bearing medium in a manner suitable for subsequent motion picture playback at standard display at standard temporal resolution said second array of digital data as an image of said second motion picture sequence.

* * * * *